(12) United States Patent
Beche et al.

(10) Patent No.: US 11,927,518 B2
(45) Date of Patent: Mar. 12, 2024

(54) METHOD FOR DETERMINING A SEDIMENTATION OR CREAMING RATE

(71) Applicants: UNIVERSITE DE RENNES 1, Rennes (FR); CENTRE NATIONAL DE LA RECHERCHE SCIENTIFIQUE (CNRS), Paris (FR)

(72) Inventors: Bruno Beche, Rennes (FR); Hervé Lhermite, Cesson Sevigne (FR); Véronique Vie, Rennes (FR); Lucas Garnier, Rennes (FR)

(73) Assignees: UNIVERSITE DE RENNES 1, Rennes (FR); CENTRE NATIONAL DE LA RECHERCHE SCIENTIFIQUE (CNRS), Paris (FR)

( * ) Notice: Subject to any disclaimer, the term of this patent is extended or adjusted under 35 U.S.C. 154(b) by 878 days.

(21) Appl. No.: 16/966,416

(22) PCT Filed: Jan. 17, 2019

(86) PCT No.: PCT/EP2019/051103
§ 371 (c)(1),
(2) Date: Jul. 30, 2020

(87) PCT Pub. No.: WO2019/149530
PCT Pub. Date: Aug. 8, 2019

(65) Prior Publication Data
US 2020/0363307 A1   Nov. 19, 2020

(51) Int. Cl.
*G01N 15/05* (2006.01)
*G01N 33/86* (2006.01)

(52) U.S. Cl.
CPC ....... *G01N 15/05* (2013.01); *G01N 2015/055* (2013.01)

(58) Field of Classification Search
CPC ... G01N 15/05; G01N 33/86; G01N 2015/055
See application file for complete search history.

(56) References Cited

U.S. PATENT DOCUMENTS

| | | | | |
|---|---|---|---|---|
| 4,187,462 A | * | 2/1980 | Haker | G01N 15/05 324/207.17 |
| 5,827,746 A | * | 10/1998 | Duic | G01N 15/042 73/61.68 |
| 2004/0065143 A1 | * | 4/2004 | Husher | G01N 33/491 73/61.49 |

FOREIGN PATENT DOCUMENTS

| | | |
|---|---|---|
| EP | 2927689 A1 | 10/2015 |
| JP | 2001-046360 A | 2/2001 |

OTHER PUBLICATIONS

Apr. 16, 2019 International Search Report issued in International Patent Application No. PCT/EP2019/051103.

* cited by examiner

*Primary Examiner* — Randy Boyer
(74) *Attorney, Agent, or Firm* — Williams Mullen; R. Brian Drozd

(57) ABSTRACT

A method for determining a rate of sedimentation or of creaming of a mixture in suspension, including an application of a sample of the mixture in suspension to a photonic microresonator, an application of a first optical signal at the input of the photonic microresonator carrying the sample of the mixture in suspension, an acquisition and a recording of a second optical signal, delivered at the output of the microresonator carrying the sample of the mixture in suspension, and a determination of information representing a rate of sedimentation or of creaming of the mixture from the recorded second signal, by successive iterations of spectral analysis of the second optical signal.

2 Claims, 2 Drawing Sheets

METHOD FOR DETERMINING A SEDIMENTATION OR CREAMING RATE

1. FIELD OF THE INVENTION

The present invention relates to a method for determining a sedimentation or creaming rate. The invention relates more particularly to a measurement of sedimentation or creaming rate by photonic characterisation.

2. PRIOR ART

Sedimentation characterises a gradual positioning of particles of matter in layers according to factors that are varied in number and proportion. The movements of particles or elements have a great influence on the rate of sedimentation and fluid mechanics has overall an important role in the sedimentation process. The viscosity of a medium and the particle size also have a strong effect on the sedimentation rate. The same considerations are applicable to creaming by measuring the rising of elements of the droplet type, in suspension this time.

Sedimentation and creaming are in fact two "analogous" phenomena. In one case the "particles" that are in the liquid have a density greater than that of the liquid, and in the other case a lower density. In other words, in one case the particles (or elements) descend under the majority action of gravity (sedimentation), and in the other case they rise under the majority action of buoyancy (creaming).

For example, in the health field, the sedimentation rate defines the phenomenon of blood sedimentation, that is to say the mechanism of descent of red corpuscles in suspension. This parameter is known for reflecting the presence of an inflammatory syndrome, such as the presence of rheumatism or arteritis, or an infectious syndrome for example. This is because, when inflammation is present, the red corpuscles stick to each other and the rate of descent thereof then accelerates. A rapid measurement of the sedimentation rate can therefore prove to be very useful, in particular in the case of a medical orientation test.

Solutions exist for measuring the sedimentation or creaming rate. These solutions use either a measurement of variation in intensity of the light or X-rays passing through a suspension, or a determination of mass by means of an acoustic-wave device (piezoelectric thin film technology).

The determination of a sedimentation or creaming rate according to the prior art is however not very quick and the precision of a measurement over a given interval of time can be improved.

3. SUMMARY OF THE INVENTION

The invention makes it possible to ameliorate at least some of the drawbacks of the prior art by proposing a method for determining a sedimentation or creaming rate of a mixture in suspension, comprising an application of a sample of the mixture in suspension to a photonic microresonator, an emission of a first optical signal at the input of the photonic microresonator carrying the sample of the mixture in suspension, an acquisition and a recording of a second optical signal, delivered at the output of the microresonator carrying the sample of the mixture in suspension, and a determination of information representing a sedimentation or creaming rate of the mixture in suspension from the second optical signal recorded, by successive iterations of spectral analysis of the second optical signal.

Advantageously, the dynamic change in the second optical signal analysed represents the gradual increase, under the effect of gravity, of a layer of particles contained in the sample. The time taken for forming a layer of predetermined thickness represents the rate of sedimentation or creaming of the mixture in suspension.

Advantageously, a comparison of the quantified second optical signal resonating in the microresonator and of the first optical signal thus operating as a reference, allows identification of spectral purity peaks the amplitude, positioning and variations of which make it possible to define, in a short interval of time, information representing the rate of sedimentation or of creaming under gravity of the sample of the mixture in suspension positioned on the microresonator, for a given viscosity.

The method according to the invention cleverly uses a measurement of variation of the colours, intensities and spectral purities of each colour (or spectral component) of an optical signal modified in the microresonator by the presence and the nature of the sample during sedimentation or creaming (and therefore as a function of time), disposed on the microresonator using a phenomenon of cyclic counter-propagation with resonance.

According to one embodiment of the invention, the first optical signal is generated from a reference light source comprising a single spectral component, such as, by way of example, a broad-spectrum or tunable laser.

According to a variant of the embodiment, the first optical signal comprises a plurality of spectral components combined in the same first optical signal, so that each of these components will be transformed into a colour comb by the microresonator and visible at the output of the microresonator.

According to one embodiment of the invention, said optical microresonator is a nanoresonator with a composite structure comprising a polymer resin defining a cavity in ring form (circular, elliptical or oval shape, by way of non-limitative example, in two planar dimensions), manufactured by a microtechnology method.

Advantageously, the cavity thus produced operates as a resonating light sensor at the spectral level, which then creates a colour comb (a plurality of colour components) and, after reception and analysis of the second optical signal thus modified and delivered at the output of the microresonator, makes it possible to compare, component by component, cleverly and according to the invention, variations in colour, colour intensity and colour spectral purity of the second optical signal delivered by the microresonator, as a function of time, and therefore in a mode of dynamic monitoring of growth of a layer of particles in the mixture in suspension.

Advantageously, this type of resonator affords a high resolution of analysis of the second optical signal, delivered at the output of the microresonator, during an increase in thickness of the layer (sedimentation or creaming) as from the first 200 nm of thickness. In other words, the clever combination of the use of a microresonator and dynamic analysis over time, with calculation iterations over periods each having a duration of around one second (between 0.5 seconds and 2 seconds), makes it possible to very quickly obtain information representing a rate of sedimentation or creaming of a sample. The accumulation of a layer during deposition can thus be detected very quickly compared with the known techniques. The techniques according to the prior art do not make it possible to obtain information representing a sedimentation or creaming rate after a few minutes, as is the case with the method used according to the invention.

The invention also relates to a device implementing the aforementioned method and which comprises a photonic microresonator (or nanoresonator) configured to receive a sample of a mixture in suspension during sedimentation or creaming (and therefore layer growth), an emitter of a first optical signal oriented (applied) at the input of the photonic resonator, a module for acquiring and recording a second signal, delivered at the output of the microresonator carrying the sample of the mixture in suspension, and a module for determining at least one item of information representing a rate of sedimentation or creaming of the mixture in suspension from the second optical signal recorded, by successive iterations of spectral analysis of the second optical signal.

The use of a microresonator, combined with the other elements of the signal-processing chain described above and with which it is integrated, makes it possible to detect a gradual thickening of a layer of particles in suspension, as from the start, under the effect of gravity, in the sample placed on the microresonator, and to deduce therefrom a rate of sedimentation or creaming of the mixture in suspension by spectral analysis of the signal available at the output of the microresonator.

According to one embodiment of the invention, the module for acquiring and recording the signal available at the output of the microresonator comprises an optical sensor, of the CCD (charge coupled device) type for example, and a digital sampling and recording module as well as a spectral analyser.

Advantageously, the aforementioned method implemented in the device according to the invention makes it possible to measure, dynamically and in a short time, the rate of sedimentation of blood plasma when the sample of a mixture of suspension is a drop or droplet of blood.

The method described is however operative for a measurement of sedimentation or creaming (increase in layer thickness) in any type of mixture in suspension.

4. LIST OF FIGURES

The invention will be better understood and other particularities and advantages will emerge from the reading of the following description, the description referring to the accompanying drawings, among which:

5. DETAILED DESCRIPTION OF EMBODIMENTS OF THE INVENTION

Figure 2:
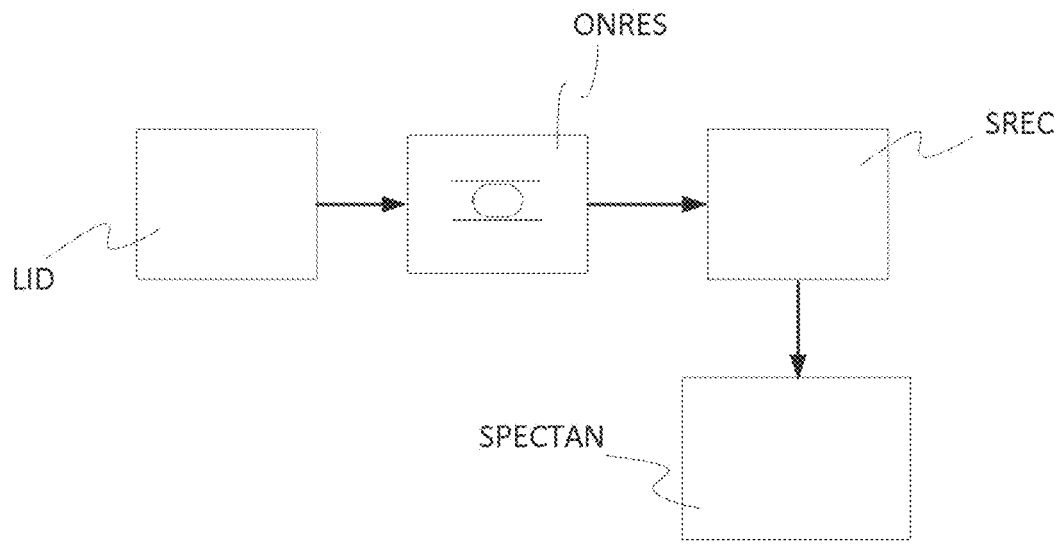
FIG. 2 depicts a system configured to implement the method, according to a particular and non-limitative embodiment of the invention.
Figure 3:
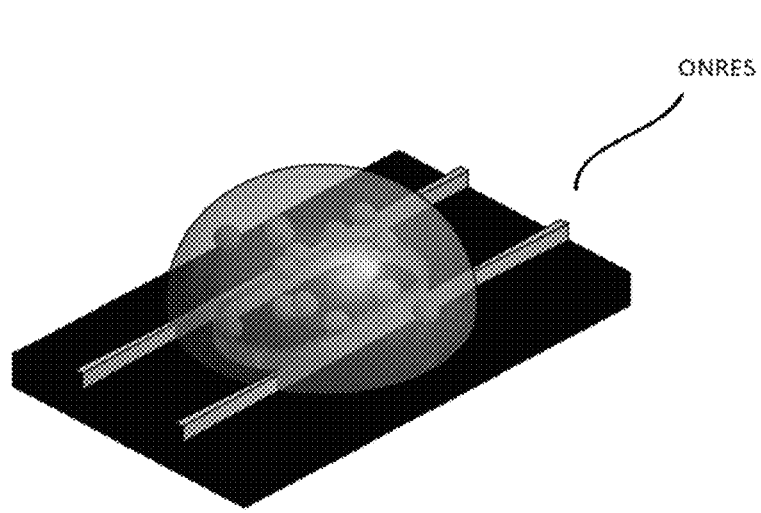
FIG. 3 depicts a photonic microresonator arranged for a measurement of rate of sedimentation or creaming according to the method implemented in the system of FIG. 2.

In FIGS. 2 and 3, the modules depicted are functional units, which correspond or not to physically distinguishable units. For example, these modules or some of them are grouped together in a single component, or consist of functionalities of the same software. On the other hand, according to other embodiments, some modules are composed of separate physical entities.

Figure 1:
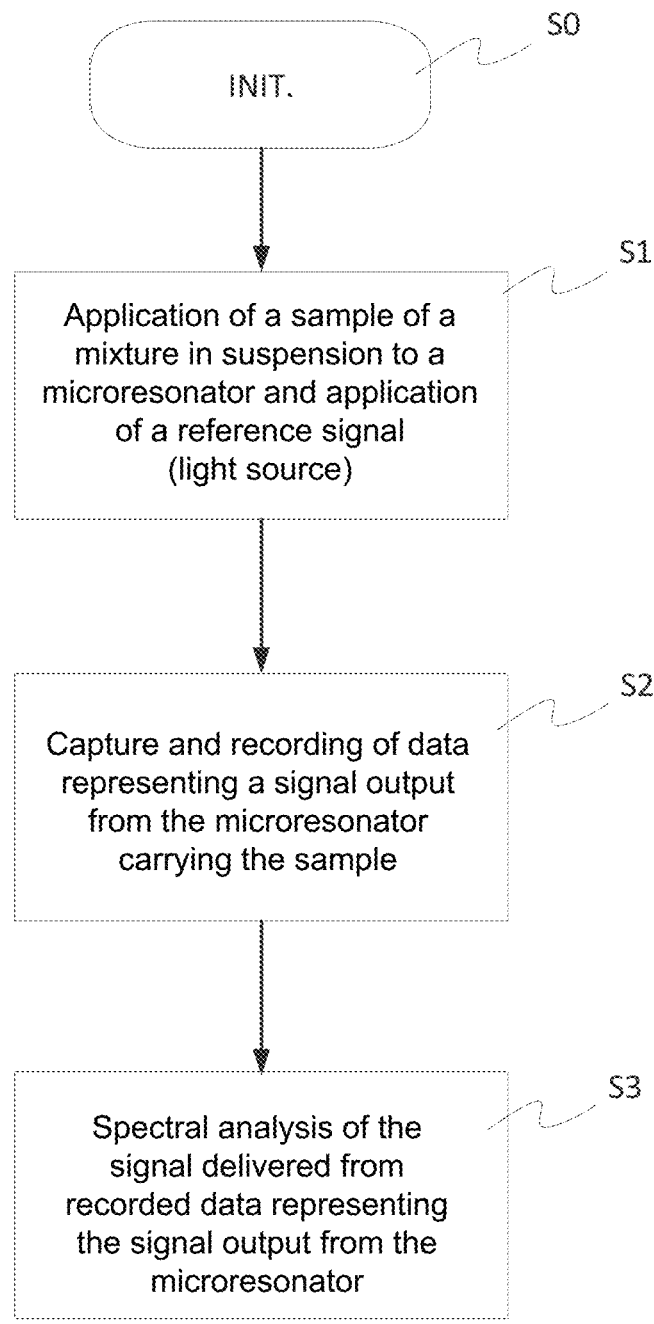
FIG. 1 is a diagram depicting essential steps of the method according to the invention.

FIG. 1 is a diagram depicting essential steps of the method according to the invention.

The step S0 constitutes an initial step during which a reference light source LID of the laser type is configured to emit a first optical signal OSIG1 (so-called reference signal) at the input of a microresonator ONRES. The microresonator ONRES is of the lateral coupling type and is developed, for example, according to a lithographic method, in a type UV210 polymer, using UV (ultraviolet) radiation to define submicrometric patterns. The first optical signal OSIG1 emitted by the light source LID is then modified in a colour comb in the microresonator, which inhibits the presence of certain colour components.

The application of the first optical signal OSIG1 to the microresonator ONRES uses normal means such as, optionally, optical fibre, a concentrator, or one or more polarisers, all these elements being disposed and aligned so as to be able to insert the optical signal in an input branch of the microresonator ONRES. During this initial step, optical elements adapted to capture a second optical signal OSIG2 from an output branch of the microresonator ONRES are also configured. According to one embodiment of the invention, a set of optical lenses allows transmission of the second optical signal OSIG2 varying as a function of time, between the output of the microresonator ONRES and a high-definition CCD microsensor connected to an acquisition and recording module RSEC. The module RSEC optionally (and according to the nature of the signals output from the CCD sensor) comprises a fast analogue to digital sampler configured to deliver a digital data stream representing the variable second optical signal OSIG2 delivered as an output from the microresonator ONRES.

The acquisition and recording device is operational and comprises all the elements conventionally used for implementing a digital signal processing, namely one or more microcontrollers, non-volatile memories for storing the code executable by the microcontroller or microcontrollers, one or more random access memory modules useful for storing functional parameters and data representing the digitised second optical signal OSIG2, power supply circuits, one or more zeroing circuits, and one or more clock circuits, this list not being exhaustive. The various optical architecture elements of the system according to the invention are not described in any further detail since they are conventional and are not useful as such for an understanding of the invention.

Still at this initialisation step, prior to a determination of a rate of sedimentation or creaming of a mixture in suspension, a spectrum analysis module SPECTAN, connected to the acquisition and recording module SREC, is configured to perform operations of transformation of a frequency domain of the second optical signal OSIG2 to a spectral domain of this same signal. For this purpose, the spectrum analysis module SPECTAN comprises an internal computer, coupled to a control unit, configured to process the data representing the second optical signal OSIG2, previously recorded by the module SREC. The module is able to perform such a transformation by using a Fourier transform. It is also configured to record data resulting from the Fourier transform in the form of data representing the spectral form of the second optical signal OSIG2 delivered by the microresonator ONRES. In a similar fashion to the acquisition and recording module SREC, the spectral analysis module SPECTAN comprises a set of elements conventionally used for performing a digital processing of the signal, namely one or more microcontrollers, non-volatile memories for storing code executable by the microcontroller or microcontrollers, one or more random access memory modules useful for storing functional parameters and data representing the digitised second optical signal, power supply circuits, one or more zeroing circuits and one or more clock circuits, this list, there also, being non-exhaustive.

The control unit of the module SPECTAN is configured to perform, under the control of embedded software or software previously downloaded, a detection of purity peaks, representing colour components created by the microresonator ONRES and included in the second optical signal OSIG2. These purity peaks undergo variations because of the combination of the microresonator and the sample drop of mixture in suspension that it supports, because of the sedimentation or creaming of the sample of mixture of matter in suspension and the increasing accumulation of particles that are deposited in a layer above the cavity of the microresonator ONRES.

Finally, at the initial step S0, the whole of the signal-processing chain built around the optical microresonator ONRES is configured and ready for use. The first optical signal OSIG1 (laser source) is however deactivated at this stage.

At the step S1, a sample of material in the form of a mixture in suspension is positioned on the cavity of the microresonator ONRES.

The sample is for example a drop of blood comprising blood plasma and corpuscles in suspension in this plasma which, after positioning, and in the absence of stray movements of the sample, will be the subject of a sedimentation phenomenon (the effect of gravity). The first optical signal OSIG1 is activated after the sample of mixture of matter in suspension is positioned, whereas the whole of the system is kept immobile. Other types of sample may be used in order to measure and then determine a sedimentation or creaming rate.

The step S2 corresponds to the step of capturing an "image" of the reference optical signal OSIG1, seen through the optical microresonator ONRES. At this step, the acquisition and recording module SREC makes an acquisition of the optical signal OSIG2, delivered at the output of the microresonator ONRES and captured by a high-definition first CCD sensor. The CCD sensor performs, where applicable, an analogue to digital conversion of the signal next recorded in a memory module of the acquisition module SREC, before subsequent processing by the spectral analysis module SPECTAN.

At the step S3, data representing the signal OSIG2, itself representing the modification of the reference first optical signal OSIG1 by the microresonator ONRES, under the effect of the sedimentation or creaming of the sample placed on the cavity of the microresonator ONRES, are stored in the memory of the module SREC and are next transmitted to the spectral analysis module SPECTAN. According to a variant of the embodiment, the module SPECTAN is adapted to perform reading operations directly in the memory of the acquisition and recording module SREC. The module SPECTAN implements Fourier transforms by successive time windows (by iterations) and records data representing these transforms in its memory, for each of the computing iterations. The control unit performs a scrutiny of the data representing the second optical signal, in the spectral domain thus defined, and detects peaks then varying dynamically in position, in amplitude and in width, over the course of time and as the sedimentation or creaming process continues.

Finally, an analysis of the variation in the peaks known as "purity peaks" in amplitude, spectral position and/or fineness, makes it possible to gradually define, and by iteratively operating at a typical frequency of around one second (approximately), a rate of sedimentation or creaming of the mixture in suspension positioned on the cavity of the microresonator ONRES in the form of at least one item of information representing the rate of sedimentation or respectively of creaming (that is to say, in these two cases, of growth of a layer of particles, or of elements of the droplet type, agglomerating respectively in the downward or upward direction). According to a preferred embodiment of the invention, this information is then transmitted to a user-interface module that makes a display on a screen, in the form of a numerical value, a bar graph, or audible information, for example. According to a variant, the information representing the rate of sedimentation or creaming of the sample may be transmitted to a remote system, via a cable or wireless interface. Advantageously, the clever use of a microresonator coupled to an optical-signal processing chain makes it possible to define, quickly and in a few minutes, a rate of sedimentation or creaming of a mixture in suspension such as, by way of example, the rate of sedimentation of a blood sample, or the rate of creaming of two fluids in the food industry.

FIG. 2 depicts the system configured to implement the method, according to a particular non-limitative embodiment of the invention, comprising the aforementioned elements that are the reference source LIG, delivering the first optical signal OSIG1 and connected to the input of the microresonator ONRES, the output of which (of the microresonator) is connected to the acquisition and recording module SREC, the module for acquiring and recording the second optical signal OSIG2. The second optical signal OSIG2 represents variations in the signal OSIG1 made by the resonator ONRES carrying a sample of mixture in suspension during sedimentation or creaming. In the case of sedimentation, the progressive falling of particles of the mixture (for example red corpuscles) gives rise to a variation in the colour-components comb of the signal OSIG, created in the microresonator ONRES, in intensity and in position, in a spectral domain. In the case of creaming, it is the gradual rising of particles, or of elements of the droplet type, of the mixture that gives rise to a variation in the colour-component comb of the signal OSIG. The spectral analysis module SPECTAN is configured to detect these variations after capture and recording.

FIG. 3 depicts the photonic microresonator ONRES used for a measurement of rate of sedimentation or creaming implemented in the system of FIG. 2. The microresonator ONRES is of the lateral-coupling type and is developed, for example, according to a lithographic method, in a polymer of the UV210 type, using UV radiation for defining submicrometric patterns.

The invention is not limited solely to the embodiments described above and relates to any measurement of the rate of sedimentation or creaming of a mixture in suspension using an application of a sample of a mixture in suspension to a photonic microresonator, an application of a first optical signal to an input of the photonic microresonator carrying the sample of mixture in suspension, an acquisition and a recording of a second optical signal, delivered at the output of the microresonator carrying the sample of mixture in suspension, and a determination of at least one item of information representing a rate of sedimentation or creaming of the mixture in suspension from the second optical signal recorded, by successive iterations of spectral analysis of the second optical signal.

The invention claimed is:

1. A system for determining a rate of sedimentation or of creaming of a mixture in suspension, wherein the system comprises:

a photonic microresonator configured to receive a sample of a liquid in suspension, an emitter of a first optical signal configured to emit at the input of the photonic microresonator, a module for acquiring and recording a second optical signal, delivered at the output of the microresonator carrying the sample of the mixture in suspension, and a module for determining information representing a rate of sedimentation or of creaming of the mixture in suspension from the recorded second optical signal, by successive iterations of spectral analysis of the second optical signal.

2. The system for determining a rate of sedimentation or of creaming of a mixture in suspension according to claim 1, wherein the first optical signal, emitted by a source, comprises a plurality of spectral components.

* * * * *